United States Patent Office 3,328,256
Patented June 27, 1967

3,328,256
SPHERICAL BEADS AND THEIR PRODUCTION
William E. Gaunt, 280 Prospect Ave.,
Hackensack, N.J. 07601
No Drawing. Filed May 27, 1963, Ser. No. 283,623
17 Claims. (Cl. 167—82)

The present invention relates to small spherical beads containing at least one active ingredient such as a medicament and to a novel process for producing such beads which, in the case of orally ingestible beads, are so composed that the medicament is released into the alimentary fluids after ingestion at a predetermined controlled rate which will, for example, produce a sustained therapeutic effect over a period of several hours. More particularly, the invention comprises the production of extremely small spherical beads which are substantially identical in size and composition and of which each bead contains the same amount of active ingredient. The invention also includes groups of these small beads in unit dosage form as, for example, a capsule into which a sufficient number of the beads is contained to provide a unit application of the active ingredient over a prolonged period of time.

Existing procedures for producing small spherical bodies or beads containing medicaments and designed to have a sustained therapeutic effect consist usually of coating the medicament onto the surface of small beads of sugar known as nonpareil seeds and applying protective coatings of one or more materials in varying thicknesses. Under that technique, it is necessary to provide the nonpareil seeds with different numbers and/or types of coatings and in some instances the number of coatings is very large. These protective coatings are intended to resist the effects of alimentary fluids for a period of time so as to delay release of the medicament or to release it over a period of hours. In that type of product the time delay is generally related to the coating thickness or number of coatings. The thinner the total coating the shorter the delay in release of the medicament, and the greater the total coating thickness the longer is the delay in release of the medicament. Such beads are produced in groups of different coating thicknesses or number of coatings and then beads from different groups must be blended together and subdivided into specific dosage form which is usually a capsule but oftentimes a tablet. It is also customary in many instances to include uncoated seeds which contain medicament so as to give some immediate release of medicament. The protective coatings most generally used are shellac, waxes, fats, fatty acids, fatty alcohols, high molecular weight glyceride esters, film-forming polymers such as ethyl cellulose and hydroxyethyl cellulose, or a combination of one or more of these coating materials.

While the foregoing has been fairly widely adopted, it is recognized that there are a number of disadvantages. For example, conventional coating procedures do not make possible a high degree of precision in the application of the medicament or the protective materials to the sugar seeds and it is almost impossible to secure uniformity of coating from seed to seed. This important consideration alone results in a high degree of unreliability in the products so that dosage or rate of dosage cannot actually be well controlled. Another disadvantage is that protective coatings of the foregoing materials age with the passage of time and change their structure and properties thereby adversely affecting both the product and the rate of release of the medicament. The structural changes in the protective coatings are of unknown nature and are not predictable because it has been found that in some instances the rate of release of the medicament is increased, whereas in other instances the rate of release is retarded. The coating materials are also affected by exposure to temperatures of 100° F. or more and by exposure to cold or relatively low temperatures. Furthermore, when compressed into tablet form the coatings may undergo fracture as a result of the stresses to which they have been subjected. All this results in changes in the release characteristics of the preparations. The foregoing procedure is representative of the usual technique followed in making small spherical bodies containing medicament and designed to have a sustained therapeutic effect and may be termed a procedure for building up the spherical bodies from the "inside outwards."

In accordance with the present invention, it has been found that small spherical bodies or beads containing one or more active ingredients such as a medicament and designed to release the same in a predetermined controlled manner can be made from the "outside inwards." The present invention is thus predicated upon the unexpected discovery that when drops of a suitable volatile solvent are permitted to fall from a suitable height onto a bed of very finely divided particles of polymers or copolymers, each separate drop forms as a spherical body a solution of the polymer or copolymer by dissolving and drawing into it particles of the polymeric bed with which the outer surface of the drop is in contact. The thus formed spherical bodies or beads can be easily separated from the powder phase by screening and when so separated remain in discrete form showing no tendency to stick together and their existence as small discrete spherical entities is retained as the volatile solvent is removed as by evaporation and, when dry, the small spherical bodies or beads are firm and hard and capable of withstanding considerable pressure. They also have other favorable and unexpected attributes as will be apparent hereinafter.

In referring above to a polymeric bed of very finely divided particles, it is to be understood that a single polymer or copolymer may be used as well as such polymer or coplymer with one or more other substances hereinbelow termed a "cosubstance" and when such cosubstance is soluble in the solvent employed, particles of the cosubstance dissolve in the solvent drop along with particles of the polymer or copolymer and become part of the homogeneous substance of the bead which is formed; if, however, the cosubstance is insoluble in the solvent employed, particles of the cosubstance become entrapped into the body of the bead formed by the dissolution of adjacent particles of the polymer or copolymer into the solvent drop. Beads composed of the polymer and cosubstance can be made by dissolving the cosubstance in the solvent used to form the drops and causing such drops to fall onto the powder bed of finely divided polymer or copolymer particles.

Active ingredients such as medicaments can readily be incorporated into the spherical beads by dissolving or suspending the medicament in the solvent used for making the drops which form the beads when the drops are permitted to fall onto the bed of finely divided particles. Alternatively, the medicament or other active ingredient in the form of a fine powder can be uniformly mixed with the finely divided particles of the polymer bed and when the spherical beads are formed from the drops of solvent which are allowed to fall on this mixed bed the medicament or other active ingredient is uniformly dissolved or enmeshed in the beads. In both cases, the spherical bodies are then separated from the powder bed by screening and upon removal of the solvent by evaporation small firm hard beads are obtained, each of which is of the same size and contains the same amount of medicament or active ingredient.

Upon exposure of beads formed in accordance with the present invention to alimentary fluids the rate of release of the medicament or active ingredient is primarily controlled by the polymer or combination of polymers employed as the powder bed and by the cosubstance when incorporated into the powder bed as well as the properties of the polymer(s) and cosubstance. Polymers which can be successfully used for transformation into small spherical beads by the present procedure are essentially those which dissolve rapidly in the solvent employed to form highly viscous solutions preferably of almost gel-like consistency. Satisfactory spherical bodies or beads have been made, for example, from carboxypolymethylene, cellulose acetate phthalate and carboxylated polyvinyl acetate copolymers, both singly and in combination, but the foregoing are intended as illustrative and not as limitative since other polymers and copolymers can be equally well employed.

The solvents that have been used are chiefly the lower alcohols and halogenated hydrocarbons or mixtures of these solvents. The criteria for the selection of the solvent or solvents is the ability to dissolve the polymer or copolymer with or without the cosubstance in high concentration and also the ease with which the solvent or solvent mixture volatilizes and can therefore be removed rapidly from the spherical bodies or beads which are formed. The cosubstances useful in admixture with the polymer or copolymer to modify and control the medicaments are numerous, and purely by way of example substances which can successfully be used are finely divided silica gel, long-chain fatty amines such as stearylamine and dodecylamine, polyvinylpyrrolidone, cellulose acetate N,N-diethylamino acetate, aluminum aspirin, aluminum abietate, aluminum naphthenate, aluminum octoate, stearic acid, palmitic acid, fats, waxes, fatty alcohols, glyceryl monostearates, starch and acetylated monoglycerides.

In order to form beads of good roundness and smooth surface, the solvent drops should be small and the powder bed should be of such fineness that it at least passes through an 80 mesh sieve and may be as fine as 200 mesh. The powder bed should be formed of discretely separated particles showing no tendency to clump and should be of such bulk density that the solvent drop readily falls through the surface of the powder bed which must be of such thickness that the solvent drop does not fall all the way through the powder bed. Separate drops of solvent must also fall on the powder bed at points sufficiently spaced from each other to avoid coalescence or doubling. If the solvent drop is too large, the resulting bead is apt to be distorted or misshapen. If the powder bed tends to clump, the surface of the bead has projecting particles or clumps which are only partially dissolved during the formation of the bead. If the powder bed is too dense, the solvent drop "splashes" on the surface and is most likely to form a flattened disc instead of a spherical bead. If the powder bed is not sufficiently deep the solvent drop passes therethrough to the surface of the supporting container thereby becoming distorted and attaching itself to the supporting container. If one drop of solvent falls on the powder bed too close to another drop there may also be distortion or fusing of drops or beads. The size of the bead is primarily determined by the size of the solvent drop falling on the powder bed and on the composition of the powder bed and is dependent on the particle size of the powder bed. The same drop size produces larger beads with a bed of carboxylated polyvinyl acetate copolymer and aluminum aspirin than with a bed of cellulose acetate phthalate and aluminum aspirin in the same proportions. Beads ranging in diameter from 0.3 millimeter to 3.5 millimeters have been made.

The present invention has several advantageous differences over prior practices. With any given powder bed, solvent mix and medicament concentration, every bead is identical and begins to release its medicament immediately upon exposure to alimentary fluids and continues to do so as long as there is any bead material left. There is no dependency for the sustained effect on the dissolving away of coatings from beads of mixed and heterogeneous compositions. The quantity or proportion of medicament in each bead can be precisely established in advance by determining the volume of the solvent drop used. When the medicament is incorporated into the bead by dissolving it into the solvent used for making the bead, knowledge of the concentration of the medicament in the solvent and of the size of the solvent drop permits ready calculation of the amount of medicament which will be present in each and every bead made. When the medicament is incorporated into the bead by intimately mixing it with the powder bed knowledge of the proportion of the medicament in the powder bed provides the proportion of medicament which will be present in each bead. A further advantage of the present invention is that the factors controlling the release of medicament are all capable of very precise control. The size of the solvent drop can be readily controlled. The concentration of medicament in the solvent or the proportion of medicament in the powder bed is easily controlled. The composition of the powder bed is, of course, readily controlled. Consequently, the invention makes possible the production of medicament containing beads, every one of which is identical within a single batch, and it also permits the production of medicament-containing beads which are identcial from batch to batch. A still further advantage is that since the beads are homogeneous throughout their structures there are no protective coatings or other materials present which are susceptible to change or aging. In addition, the nature of the materials in the powder bed is such that further polymerization with consequent change in release characteristics does not occur.

A particularly interesting and advantageous feature of the present invention is that any number of beads from one to a very large number can be made of identical composition. This is in contradistinction to prior procedures in which scale-up problems are of such magnitude that the performance of beads made on a small scale bears only an approximate relationship to the performance of beads made on a large scale. It is particularly important that the present invention makes is possible to produce a small number of beads with the assurance that they truly represent an accurate sample of beads which can be produced on much larger scales, and this is especially valuable in the development of a desired dosage form of medicament. It is also readily possible to produce several experimental samples of beads of differing compositions in order that they may be subjected to suitable tests to determine the most suitable composition of bead for the specific purpose intended. Moreover, since it is now rather usual to resort to radioactive tracer techniques in the clinical evaluation of a sustained release dosage form, the present invention permits the production of the few beads needed for this evaluation with no hazard and with great economy. This cannot be done with existing methods.

Various types of active ingredients and medicaments can be incorporated into small spherical beads in accordance with the present invention. These include tranquilizing drugs such as meprobamate, promazine and other phenothiazines, analgesics such as acetylsalicylic acid, acetaminophenol and phenacetin, antihistamines such as chlorpheniramine, pheniramine and methapyrilene, steroids such as prednisone, prednisolone and triamcinolone, anorexic drugs such as the amphetamines, phenmetrazine and phendimetrazine, antibiotics such as penicillin and the tetracyclines, decongestant drugs such as phenylephrine, phenylpropanolamine and ephedrine, antitussive drugs such as dextromethorphan and carbetapentane, anticholinergic antispasmodics such as pentapiperide methyl sulfate, the belladonna alkaloids and barbiturates, antibacterials and antifungals. More than one drug can be incorporated into the same bead structure by dissolving all the drugs in the solvent, by blending all the drugs into the powder bed or by dissolving some drugs in the solvent and blending some with the powder bed.

Release of the active ingredient or medicament from a bead is essentially due to the gradual dissolution of the components of the powder bed which enter into the composition of the bead. While there may be some incidental leaching, this is not a significant factor. In those instances where carboxypolymethylene, carboxylated polyvinyl acetate copolymers and cellulose acetate phthalate are used, the dissolution of a bead is to some extent pH dependent. The selection of the other substance or substances used in combination with the polymer or copolymer and the proportions employed are based upon the extent to which it is desired to extend dissolution of the bead on the alkaline side. With any specific drug and powder bed composition, each bead dissolves exactly like every other bead and progressively diminishes in size until it completely disappears. At any stage up to complete dissolution, the remaining smaller bead is of the same proportionate composition and the same hardness and firmness as the original bead.

The polymer itself can be exclusively used for bead formation but there is a limit to the proportion of added substance (cosubstance) which can be used in admixture with the polymer to form a bead which, after drying, is hard and firm. In proportions outside these limits the bead is friable and breaks readily under pressure. For example, 5 parts of polymer and 95 parts of cosubstance give a friable bead when using cellulose acetate phthalate and aluminum aspirin, whereas lesser proportions of the cosubstance do not. Thus, for example, when using cellulose acetate phthalate particles as the polymer bed the proportion of cellulose acetate phthalate ranges from 10 percent to 100 percent, and the cosubstance such as aluminum aspirin ranges from 90 percent to 0 percent. The ranges under various exemplary circumstances will be apparent from the subjoined examples. The drop size ranges from 1.25 to 15 microliters and the bead size ranges from 0.3 to 3.5 millimeters in diameter. The solvent may be a single organic solvent or it may be a solvent mixture composed of a plurality of solvents. A particularly good solvent mixture is 90 percent methylene chloride and 10 percent methanol by volume.

The invention is illustrated by the following non-limitative examples in which the proportions of solvents in the solvent mixtures are by volume.

EXAMPLE 1

A solvent mixture composed of 85 parts of methylene chloride and 15 parts of methanol was added dropwise from an eye dropper onto the surface of a bed of cellulose acetate phthalate in fine powder form at least as fine as 80 mesh. Drops were made to fall on different places of the powder bed and these drops disappeared below the surface of the powder bed without, however, penetrating entirely through the powder bed. The spherical beads which formed were removed by screening and although the beads were somewhat soft in the beginning, they remained discrete and showed no tendency to stick or fuse together. The solvent gradually evaporated and the spherical beads retained their shape and became firm, hard and tough.

Using a fine glass capillary tube delivering a drop of 2.5 microliters in volume in place of the eye dropper, much smaller solvent drops were formed and were allowed to fall on the cellulose acetate phthalate powder bed. In this case also the drops disappeared below the surface of the powder bed but did not penetrate entirely through the powder bed. Upon screening the powder, small spherical beads remained on the screen which were much smaller and more uniform in shape than those obtained from the eye dropper. The beads remained discrete showing no tendency to coalesce and they dried out by evaporation of solvent while retaining their initial shape to become firm, tough beads. The beads have an average weight of 1.2 milligrams and an average diameter of 1.4 millimeters.

EXAMPLE 2

Drops of a solution of 4 grams of dodecylamine in 20 milliliters of a mixture of 9 parts of chloroform and 1 part of isopropanol were permitted to fall on a powder bed of 200 mesh cellulose acetate phthalate. Where each drop landed, a soft bead formed which rapidly became much firmer in consistency after separation from the powder bed. Upon removal of the solvent by evaporation, the beads were found to be exceedingly tough and hard.

EXAMPLE 3

Drops of a solution of 2 grams of aluminum abietate in a mixture of 9 milliliters of methylene chloride and 1 milliliter of methanol were permitted to fall on a powder bed of 200 mesh cellulose acetate phthalate. Each drop quickly formed a homogeneous bead of good shape and pleasing appearance. The beads, after separation from the cellulose acetate phthalate powder, were dried to form firm, hard, brittle beads.

This example also shows that the powder bed can be 100 percent cellulose acetate phthalate and that the cosubstance can be in the drops.

EXAMPLE 4

Into 50 milliliters of the solvent mixture consisting of 85 parts of methylene chloride and 15 parts of methanol, 50 milligrams of vitamin $B_{12}$ were dissolved, thus providing a red-colored solution. Drops of this solution were permitted to fall directly onto the surface of a powder bed composed of equal parts of cellulose acetate phthalate and aluminum aspirin. Where each drop fell a red bead was formed. None of the redness of the solvent was imparted to the powder bed. All the vitamin $B_{12}$ in the solvent drop was retained by the drop and incorporated into the body of the beads formed. The beads were separated from the powder bed by screening and the solvent was removed by evaporation. The small red-colored spherical beads obtained were firm, hard and brittle.

EXAMPLE 5

The following powder beds were prepared:

| | Parts |
|---|---|
| (A) Cellulose acetate phthalate | 2 |
| Aluminum aspirin | 8 |
| (B) Cellulose acetate phthalate | 5 |
| Aluminum aspirin | 5 |
| (C) Cellulose acetate phthalate | 8 |
| Aluminum aspirin | 2 |
| (D) Carboxylated polyvinyl acetate copolymer | 5 |
| Aluminum aspirin | 5 |
| (E) Carboxylated polyvinyl acetate copolymer | 8 |
| Aluminum aspirin | 2 |

Beads were made from each powder bed using a solvent mixture of 8 parts of methylene chloride and 2 parts of methanol and a capillary tube was used to deliver drops, each of which had a volume of 3.4 microliters. The beads were collected, dried and weighed with the following results:

| Powder bed: | Average bead weight, mg. |
|---|---|
| A | 2.5 |
| B | 2.0 |
| C | 2.0 |
| D | 4.6 |
| E | 5.6 |

EXAMPLE 6

The following powder beds were prepared:

| | Parts |
|---|---|
| (A) Cellulose acetate phthalate | 95 |
| Aluminum aspirin | 5 |
| (B) Cellulose acetate phthalate | 10 |
| Aluminum aspirin | 90 |
| (C) Cellulose acetate phthalate | 5 |
| Aluminum aspirin | 95 |

Bears were made from each powder bed using a solvent mixture of 7 parts of methylene chloride and 3 parts of methanol. The beads which formed were separated from the powder beds and dried. The beads from powder bed A were well formed, hard and tough. The beads formed from power bed B were practically equally satisfactory. The beads from powder bed C were extremely friable so as to illustrate that the proportions of cellulose acetate phthalate and aluminum aspirin used are beyond the practical limits of the process. As elsewhere stated, it is understood that the powder bed can be 100 parts cellulose acetate phthalate and that such is entirely practical.

EXAMPLE 7

A solvent mixture composed of 9 parts of methylene chloride and 1 part of methanol was sprayed onto a powder bed composed of 2 parts of 200 mesh cellulose acetate phthalate and 8 parts of 200 mesh aluminum aspirin. The powder was screened through a 200 mesh sieve and the beads which had been formed were collected. These beads were small and well formed and ranged in size from 0.3 millimeters to 0.5 millimeters in diameter.

EXAMPLE 8

Using the same solvent mixture and powder bed composition of Example 7, drops of 15 microliters in size were permitted to fall onto the surface of the powder bed. The beads formed were quite large and after separation from the powder and drying, measured approximately 3.5 millimeters in diameter. The beads tended to be somewhat flattened at their poles, measuring approximately 3 millimeters in this dimension. However, by rolling the beads or keeping them in motion, their initial spherical shape can be substantially preserved.

EXAMPLE 9

A solution of 2 grams of phenylephrine hydrochloride and 400 milligrams of chlorpheniramine maleate in 30 milliliters of a mixture of 80 parts of methylene chloride and 20 parts of methanol was prepared. Drops of this solution from a capillary tube were permitted to fall on a bed composed of 3 parts of cellulose acetate, phthalate and 7 parts of aluminium aspirin. The beads formed were separated from the powder bed and dried. The average weight of the beads was 3.65 milligrams and each bead contained 0.2 milligram of phenylephrine hydrochloride and 0.04 milligram of chlorpheniramine maleate.

EXAMPLE 10

A solution of 600 milligrams of prednisolone in 10 milliliters of a mixture of 70 parts of methylene chloride and 30 parts of methanol was prepared. Drops of this solution of 3.3 microliter volume were permitted to fall on a powder bed composed of 2 parts of cellulose acetate phthalate and 8 parts of aluminum aspirin which had been screened through a 200 mesh sieve. The beads formed by the solution drops were separated by screening and dried by evaporation. The beads were of excellent shape and appearance, had an average weight of 2.6 milligrams and each bead contained approximately 0.2 milligram of prednisolone.

On exposure to simulated gastric fluid for one hour followed by simulated intestinal fluid, the following release data were obtained:

| | Cumulate percent release |
|---|---|
| After one hour gastric (total 1 hours) | 19 |
| After two hours intestinal (total 3 hours) | 54 |
| After two further hours intestinal (total 5 hours) | 81 |
| After two further hours intestinal (total 7 hours) | 90 |

EXAMPLE 11

A powder bed composed of 2 parts 200 mesh cellulose acetate phthalate and 8 parts of 200 mesh aluminum aspirin was prepared. A solution of 2 grams of pentapiperide methyl sulfate in 10 milliliters of a solvent mixture composed of 80 parts of methylene chloride and 20 parts of methanol was prepared. Drops of 3.3 microliter size of the pentapiperide methyl sulfate solution were permitted to fall on the powder bed and the beads that formed were collected and dried. The beads were of excellent shape and appearance, had an average weight of 3.2 milligrams and each bead contained 0.67 milligram of the drug.

On exposure to simulated gastric and intestinal fluids the following release data were obtained:

| | Percent cumulative release |
|---|---|
| 1 hour gastric | 6 |
| 2 hours intestinal | 54 |
| 4 hours intestinal | 78 |
| 6 hours intestinal | 92 |

EXAMPLE 12

A powder bed composed of 2 parts of cellulose acetate phthalate, 2 parts of carboxypolymethylene and 8 parts of aluminum aspirin was prepared and screened through a 200 mesh sieve. A solution of 2 parts of chlorpromazine hydrochloride in 10 milliliters of a solvent mixture of 85 parts of methylene chloride, 12 parts of methanol and 3 parts of water was prepared. Drops of 3.3 microliter size of the chlorpromazine hydrochloride solution were permitted to fall on the powder bed. The beads which formed were separated from the powder by screening and dried by evaporation. The average weight of the beads was 3.6 milligrams and each bead contained approximately 0.67 milligram of chlorpromazine hydrochloride.

On exposure to simulated gastric and intestinal fluids, the beads showed the following release characteristics:

| | Percent cumulative release |
|---|---|
| 1 hour gastric | 25 |
| 2 hours intestinal | 48 |
| 4 hours intestinal | 72 |
| 6 hours intestinal | 87 |

EXAMPLE 13

(A) A powder bed composed of 400 grams of 80 mesh cellulose acetate phthalate and 1200 grams of aluminum aspirin powder was made and placed in a small coated pan. A solution was prepared consisting of 10 grams of chlorpheniramine maleate in 150 milliliters of a solvent mixture of 80 parts of methylene chloride and 20 parts of methanol. The solution was added dropwise to the powder bed in the coating pan while the coating pan was rotating. After the addition of several milliliters of the chlorpheniramine maleate solution to the powder bed, the powder bed was screened and the formed beads were collected. The solvent was removed by evaporation to give several thousand satisfactory beads.

(B) The above was repeated using 200 mesh cellulose acetate phthalate and aluminum aspirin. The beads obtained were somewhat superior to those of A.

EXAMPLE 14

This example is essentially a 2 x 2 x 2 x 2 experiment designed to determine the influence on bead weight, size, appearance and release characteristics of the powder bed composition, the particle size of the powder bed, the solvent composition and the concentration of medicament in the solvent.

The following diagram respresents the design of the experiment:

|  |  | $B_1$ | | $B_2$ | |
|---|---|---|---|---|---|
|  |  | $P_1$ | $P_2$ | $P_1$ | $P_2$ |
| $M_1$ | $S_1$ |  |  |  |  |
|  | $S_2$ |  |  |  |  |
| $M_2$ | $S_1$ |  |  |  |  |
|  | $S_2$ |  |  |  |  | where $B_1$ and $B_2$ symbolize powder bed composition, $P_1$ and $P_2$ powder bed particle size, $S_1$ and $S_2$ solvent composition and $M_1$ and $M_2$ medicament concentration in the solvent. The conditions selected for this experiment were as follows:

$B_1$ was a powder bed composition consisting of 8 parts of cellulose acetate phthalate and 2 parts of aluminum aspirin;
$B_2$ was a powder bed composition consisting of 2 parts of cellulose acetate phthalate and 8 parts of aluminum aspirin;
$P_1$ was a powder bed composition of 100 mesh materials;
$P_2$ was a powder bed composition of 200 mesh materials;
$S_1$ was a solvent mixture consisting of 90 parts of methylene chloride and 10 parts of methanol;
$S_2$ was a solvent mixture consisting of 65 parts of methylene chloride and 35 parts of methanol;
$M_1$ represented a concentration of 3 grams of chlorpheniramine maleate in 100 milliliters of solvent; and
$M_2$ represented a concentration of 6 grams of chlorpheniramine maleate in 100 milliliters of solvent.

The experiment was so conducted that a standard drop size of 3.3 microliters was used.

More than 1,000 beads representing the combination of each of the experimental conditions in the design of the experiment were made and the solvent was removed by evaporation. A total of sixteen different bead preparations were made.

The average weight and diameter of the beads of each preparation were determined. It was noted by visual inspection that within each preparation the beads were uniform in size and appearance and appreciable differences in size and appearance were apparent from one preparation to the next. The average weight data are given below:

*Average weight of bead in milligrams*

|  |  | $B_1$ | | $B_2$ | |
|---|---|---|---|---|---|
|  |  | $P_1$ | $P_2$ | $P_1$ | $P_2$ |
| $M_1$ | $S_1$ | 2.50 | 1.50 | 3.30 | 2.25 |
|  | $S_2$ | 2.10 | 1.10 | 2.60 | 1.80 |
| $M_2$ | $S_1$ | 2.80 | 1.50 | 3.50 | 2.25 |
|  | $S_2$ | 2.25 | 1.20 | 3.00 | 1.90 |

|  | Milligrams |
|---|---|
| Average of $B_1$ | 1.87 |
| Average of $B_2$ | 2.58 |
| Average of $P_1$ | 2.76 |
| Average of $P_2$ | 1.69 |
| Average of $S_1$ | 2.45 |
| Average of $S_2$ | 1.99 |
| Average of $M_1$ | 2.14 |
| Average of $M_2$ | 2.30 |
| Grand Average | 2.22 |

The grand average weight of all sixteen bead preparations was 2.22 milligrams with a maximum range spreading from 1.10 milligrams to 3.50 milligrams, all being obtained with the same drop size. Statistical analysis of the data reveals that the powder beds composed of 2 parts of cellulose acetate phthalate and 8 parts of aluminum aspirin ($B_2$) gave significanly heavier beads than did the powder beds composed of 8 parts of cellulose acetate phthalate and 2 parts of aluminum aspirin ($B_1$).

Furthermore, the powder beds of 100 mesh materials ($P_1$) gave significantly heavier beads than the powder beds of 200 mesh materials ($P_2$). The solvent composed of 90 parts of methylene chloride and 10 parts of methanol ($S_1$) gave heavier beads than the solvent composed of 65 parts of methylene chloride and 35 parts of methanol ($S_2$).

The beads from the 6 percent solution of chlorpheniramine maleate ($M_2$) proved to be heavier than those derived from the 3 percent solution ($M_1$) but only to the extent of the additional medicament present (0.1 milligram) in each 3.3 microliter drop of medicament solution. Medicament concentration $M_1$ represented approximately 0.1 milligram of chlorpheniramine maleate per drop, and medicament concentration $M_2$ represented approximately 0.2 milligram of chlorpheniramine maleate per drop. The average size of the beads in each of the sixteen different preparations is set forth below:

*Average size of beads in millimeters*

|  |  | $B_1$ | | $B_2$ | |
|---|---|---|---|---|---|
|  |  | $P_1$ | $P_2$ | $P_1$ | $P_2$ |
| $M_1$ | $S_1$ | 1.80 | 1.42 | 1.62 | 1.39 |
|  | $S_2$ | 1.73 | 1.37 | 1.52 | 1.29 |
| $M_2$ | $S_1$ | 1.90 | 1.34 | 1.55 | 1.42 |
|  | $S_2$ | 1.52 | 1.24 | 1.50 | 1.37 |

|  | Millimeters |
|---|---|
| Average of $B_1$ | 1.54 |
| Average of $B_2$ | 1.46 |
| Average of $P_1$ | 1.64 |
| Average of $P_2$ | 1.35 |
| Average of $S_1$ | 1.55 |
| Average of $S_2$ | 1.44 |
| Average of $M_1$ | 1.51 |
| Average of $M_2$ | 1.48 |
| Grand Average | 1.50 |

The average size for all the preparations made was 1.50 millimeters with beads for the individual preparations ranging from a low of about 1.25 millimeters to a high of 1.90 millimeters, this fairly wide range in size occurring despite the uniformity of the solvent drop size employed. Statistical analysis of the data reveals that solvent mixture $S_1$ provides significantly larger beads than solvent mixture $S_2$, that particle size $P_1$ gives significantly larger beads than particle size $P_2$, and that neither the powder bed compositions nor the medicament concentration had any appreciable effect on bead size.

A determination was made of the behavior of each of the sixteen bead preparations during exposure to simulated gastric fluid for one hour followed by simulated intestinal fluid for two additional hours. The data on bead medicament residue for each of these conditions are given below in terms of percentage of original value:

*Bead medicament residue after one-hour exposure to simulated gastric fluids as percent initial value*

|  |  | $B_1$ | | $B_2$ | |
|---|---|---|---|---|---|
|  |  | $P_1$ | $P_2$ | $P_1$ | $P_2$ |
| $M_1$ | $S_1$ | 96 | 97 | 94 | 94 |
|  | $S_2$ | 95 | 96 | 98 | 95 |
| $M_2$ | $S_1$ | 97 | 92 | 90 | 92 |
|  | $S_2$ | 96 | 92 | 90 | 95 |

|  | Percent |
|---|---|
| Average of $B_1$ | 95.1 |
| Average of $B_2$ | 93.5 |
| Average of $P_1$ | 94.5 |
| Average of $P_2$ | 94.1 |
| Average of $S_1$ | 94.0 |
| Average of $S_2$ | 94.6 |
| Average of $M_1$ | 95.6 |
| Average of $M_2$ | 93.0 |
| Grand Average | 94.3 |

Statistical analysis of these data reveals that within the limits of experimental error each of the bead preparations withstood the exposure to gastric juice equally well. The data obtained after the subsequent exposure of the beads for two additional hours to simulated intenstinal fluid is given below and reveals the existence of behavioral differences:

*Bead medicament residue after the additional two-hour exposure to simulated intestinal fluids as percent initial value*

|  |  | $B_1$ | | $B_2$ | |
|---|---|---|---|---|---|
|  |  | $P_1$ | $P_2$ | $P_1$ | $P_2$ |
| $M_1$ | $S_1$ | 50 | 50 | 83 | 80 |
|  | $S_2$ | 53 | 59 | 77 | 78 |
| $M_2$ | $S_1$ | 52 | 56 | 78 | 72 |
|  | $S_2$ | 60 | 58 | 72 | 73 |

|  | Percent |
|---|---|
| Average of $B_1$ | 54.8 |
| Average of $B_2$ | 76.8 |
| Average of $P_1$ | 65.6 |
| Average of $P_2$ | 65.8 |
| Average of $S_1$ | 65.2 |
| Average of $S_2$ | 66.4 |
| Average of $M_1$ | 66.4 |
| Average of $M_2$ | 65.2 |
| Grand Average | 65.7 |

Statistical analysis of these data reveals that the beads from the powder bed composition composed of 2 parts of cellulose acetate phthalate and 8 parts of aluminum aspirin ($B_2$) are significantly more resistant to the alkaline simulated intestinal fluid than the beads made from the powder bed composition of 8 parts of cellulose acetate phthalate and 2 parts of aluminum aspirin ($B_1$). In other words, the release rate from $B_1$ beads is more rapid than from $B_2$ beads. Most unexpectedly, the data reveals that neither particle size of the powder bed composition, solvent composition nor medicament concentration influenced the release characteristics of the beads despite the influence of these factors on the weight and size of the beads.

Visual inspection under low magnification of the beads which had been exposed to the simulated alimentary fluids showed that within each bead preparation the individual beads behaved in a remarkably uniform manner, each descreased in size to approximately the same extent with none appearing abnormally large and none appearing abnormally small.

EXAMPLE 15

This example is essentially a continuation of Example 14 and is a 2 x 2 x 2 x 2 designed experiment comparing the influence of powder bed composition, powder bed particle size, solvent composition and drop size on bead weight, size and release characteristics.

The powder bed compositions ($B_1$ and $B_2$) were the same as in the previous example. The solvent mixtures ($S_1$ and $S_2$) were the same as in the previous example. The particle sizes of the powder beds ($P_1$ and $P_2$) were the same as in the previous example. The drop size ($D_2$) had a volume of approximately 1.25 microliters. The drop size ($D_1$), as in the previous example, had a volume of approximately 3.3 microliters. In this experiment the medicament concentration was 6 grams of chlorpheniramine maleate in 100 milliliters of the solvent ($M_2$) of the previous example.

As in the previous example, more than 1,000 beads were made of each of the eight preparations using drop size $D_2$. The beads from each of these preparations were freed of solvent and the average bead weight, bead size and the behavior toward simulated alimentary fluids were determined. The data obtained were compared with the data of the previous example pertaining to drop size $D_1$ using medicament concentration $M_2$.

The following provides the comparison of average bead weight:

*Average bead weight in milligrams*

|  |  | $B_1$ | | $B_2$ | |
|---|---|---|---|---|---|
|  |  | $P_1$ | $P_2$ | $P_1$ | $P_2$ |
| $D_1$ | $S_1$ | 2.80 | 1.50 | 3.50 | 2.25 |
|  | $S_2$ | 2.25 | 1.20 | 3.00 | 1.90 |
| $D_2$ | $S_1$ | 1.50 | 0.80 | 1.70 | 1.20 |
|  | $S_2$ | 1.20 | 0.60 | 1.40 | 0.95 |

|  | Milligrams |
|---|---|
| Average of $B_1$ | 1.48 |
| Average of $B_2$ | 1.98 |
| Average of $P_1$ | 2.17 |
| Average of $P_2$ | 1.30 |
| Average of $S_1$ | 1.91 |
| Average of $S_2$ | 1.56 |
| Average of $D_1$ | 2.30 |
| Average of $D_2$ | 1.17 |
| Grand Average | 1.73 |

The overall average bead weight in this experiment was 1.73 milligrams but the range from one bead preparation to another spread from 0.60 milligram to 3.50 milligrams, which is almost a sixfold difference. The statistical analysis of the data showed that powder bed $B_2$ (2 parts of cellulose acetate phthalate and 8 parts of aluminum aspirin) gave heavier beads than powder bed $B_1$ (8 parts of cellulose acetate phthalate and 2 parts of aluminum aspirin), that the 100 mesh powder bed ($P_1$) gave heavier beads than the 200 mesh powder bed ($P_2$), that solvent mixture $S_1$ (90 parts of methylene chloride and 10 parts of methanol) gave heavier beads than solvent mixture $S_2$ (65 parts of methylene chloride and 35 parts of methanol), all of which findings are consistent with the previous example, and the data revealed that a drop having a volume of 3.3 microliters ($D_1$) gave a heavier bead than a drop having a volume of 1.25 microliters ($D_2$) which was not surprising.

The average size of the beads in millimeters is given below:

*Average bead size in millimeters*

|  |  | $B_1$ | | $B_2$ | |
|---|---|---|---|---|---|
|  |  | $P_1$ | $P_2$ | $P_1$ | $P_2$ |
| $D_1$ | $S_1$ | 1.90 | 1.34 | 1.55 | 1.42 |
|  | $S_2$ | 1.52 | 1.24 | 1.50 | 1.37 |
| $D_2$ | $S_1$ | 1.34 | 1.19 | 1.42 | 1.27 |
|  | $S_2$ | 1.34 | 0.99 | 1.29 | 1.02 |

Millimeters
Average of $B_1$ _____ 1.36
Average of $B_2$ _____ 1.35
Average of $P_1$ _____ 1.48
Average of $P_2$ _____ 1.23
Average of $S_1$ _____ 1.43
Average of $S_2$ _____ 1.28
Average of $D_1$ _____ 1.48
Average of $D_2$ _____ 1.23

Grand Average _____ 1.35

Although the beads within each separate preparation were remarkably uniform in size, the range in bead size extended from about 1 millimeter to about 2 millimeters. Statistical analysis of the data revealed that the larger beads were obtained from the larger drop size ($D_1$), the solvent mixture of 90 parts of methylene chloride and 10 parts of methanol ($S_1$) and the powder bed of 100 mesh material ($P_1$), whereas powder bed composition had no influence on bead size.

The data on bead medicament residue after exposure of the beads to simulated gastric fluids are given below:

*Bead medicament residue after one-hour exposure to simulated gastric fluid as percent of initial value*

|  |  | $B_1$ | | $B_2$ | |
|---|---|---|---|---|---|
|  |  | $P_1$ | $P_2$ | $P_1$ | $P_2$ |
| $D_1$ | $S_1$ | 96 | 92 | 90 | 91 |
|  | $S_2$ | 96 | 92 | 90 | 95 |
| $D_2$ | $S_1$ | 89 | 86 | 81 | 79 |
|  | $S_2$ | 97 | 90 | 84 | 80 |

Percent
Average of $B_1$ _____ 92.4
Average of $B_2$ _____ 86.4
Average of $P_1$ _____ 90.5
Average of $P_2$ _____ 88.2
Average of $S_1$ _____ 88.0
Average of $S_2$ _____ 90.5
Average of $D_1$ _____ 92.8
Average of $D_2$ _____ 85.8

Grand Average _____ 89.3

Statistical analysis of the data reveals that the particle size of the powder bed, the powder bed composition and the solvent mixture do not influence the resistance of the beads to simulated gastric fluids but that analysis indicates that the beads from the smaller drop ($D_2$) are more susceptible to simulated gastric fluid than the beads from the larger drop ($D_1$) although the extent of the difference is relatively small.

Data on the continued exposure of these beads to simulated intestinal fluids for two hours is given below:

*Bead medicament residue after two hours further exposure to simulated intestinal fluids as percent of initial value*

|  |  | $B_1$ | | $B_2$ | |
|---|---|---|---|---|---|
|  |  | $P_1$ | $P_2$ | $P_1$ | $P_2$ |
| $D_1$ | $S_1$ | 50 | 56 | 78 | 72 |
|  | $S_2$ | 60 | 58 | 72 | 73 |
| $D_2$ | $S_1$ | 40 | 38 | 56 | 67 |
|  | $S_2$ | 43 | 32 | 58 | 53 |

Percent
Average of $B_1$ _____ 47.1
Average of $B_2$ _____ 66.1
Average of $P_1$ _____ 57.1
Average of $P_2$ _____ 56.1
Average of $S_1$ _____ 57.1
Average of $S_2$ _____ 56.1
Average of $D_1$ _____ 64.9
Average of $D_2$ _____ 48.3

Grand Average _____ 56.6

Statistical analysis of these data shows that whereas the particle size of the powder bed and the nature of the solvent mixture employed do not influence the release rate of the beads, the composition of the powder bed and the size of the solvent drop used are significantly important. The beads from the smaller drop ($D_2$) release medicament more quickly than beads from the larger drop ($D_1$), and the beads from the powder bed composed of 8 parts of cellulose acetate phthalate and 2 parts of aluminum aspirin ($B_1$) release medicament more quickly than the beads from the powder bed composed of 2 parts of cellulose acetate phthalate and 8 parts of aluminum aspirin ($B_2$).

Visual inspection of the $D_2$ beads after exposure to the simulated alimentary fluids reveals that even the smaller and more rapidly releasing and dissolving beads behaved in a manner just as uniform as the larger less rapidly dissolving and releasing $D_1$ beads.

Examples 14 and 15 above provide basic information on the factors influencing the weight, size and release characteristics of beads formed in accordance with the present invention. In addition, visual observation of the twenty-four different bead preparations showed that the most esthetically pleasing beads were produced by using the powder beds of smaller particle size (200 mesh) and a solvent mixture composed of 90 parts of methylene chloride and 10 parts of methanol. Beads made under these conditions had a smoother surface and a more uniform spherical shape.

EXAMPE 16

From Example 14 it will be observed that the levels of 3 percent and 6 percent medicament concentration had little, if any, significant influence on bead size and that bead weight differed only to the extent that the solvent drops with the higher medicament concentration conveyed a greater weight of drug to the beads formed. When, however, the difference in medicament concentration is greater, both the size and the weight of the beads differ.

3.3 microliter drops of a solution of 3 grams of chlorpheniramine maleate in 7.0 milliliters of a solvent mixture of 90 parts of methylene chloride and 10 parts of methanol were permitted to fall on a powder bed of 200 mesh particle size composed of 2 parts of cellulose acetate phthalate and 8 parts of aluminum aspirin. The beads which formed were separated from the powder bed by screening and then dried by evaporation of solvent. The average weight of such beads was 5.60 milligrams and the average diameter was 1.9 millimeters. By calculation, the chlorpheniramine maleate content of each bead was approximately 1.4 milligrams as compared to the 0.2 milligram drug content of beads prepared from the 6 percent medicament solution using drops of the same volume.

Similarly, beads were made using the same powder bed composition and powder bed particle size but with drops having a volume of 1.25 microliters. After separation of the beads which formed from the powder bed and removal of the solvent, the average bead weight was found to be 2.85 milligrams and the average bead diameter 1.57 millimeters. Each bead contained approximately 0.5 milligram of chlorpheniramine maleate as compared to 0.067 milligram in beads made the same way but using the 6 percent medicament concentration.

EXAMPLE 17

A solution was prepared containing 2.5 grams of tripenelamine hydrochloride, 0.2 gram of chlorpheniramine maleate, 2.5 grams of pyrilamine maleate, 2.5 grams of phenylephrine hydrochloride, 0.2 gram of methamphetamine hydrochloride and 0.2 gram of prednisolone in 60 milliliters of a solvent mixture composed of 45 milliliters of methylene chloride and 15 milliliters of methanol.

Drops of 3.3 microliter volume were permitted to fall on a powder bed composed of 2 parts of cellulose acetate phthalate and 8 parts of aluminum aspirin. The beads which formed were separated from the powder bed and dried.

The average weight of each bead was 3.5 milligrams and the average diameter 1.42 millimeters. Each bead contained approximately 0.13 milligram of each of tripenelamine hydrochloride, pyrilamine maleate and phenylephrine hydrochloride and 0.011 milligram of each of chlorpheniramine maleate, methamphetamine hydrochloride and prednisolone.

This example illustrates the incorporation of several medicaments into the solvent mixture.

EXAMPLE 18

A solution was prepared containing 150 milligrams of hyoscyamine sulfate, 10 milligrams of hyoscine hydrobromide and 30 milligrams of atropine sulfate in 150 milliliters of a solvent mixture composed of 80 percent chloroform and 20 percent methanol by volume. Drops of 3.3 microliter volume of the solution were permitted to fall onto a powder bed composed of 1 part of cellulose acetate phthalate, 5 parts of aluminum aspirin and 4 parts of aluminum octoate. The beads which formed were collected and dried. Each bead contained approximately 0.0033 milligram of hyoscyamine sulfate, 0.00022 milligram of hyoscine hydrobromide and 0.00067 milligram of atropine sulfate.

This example illustrates that beads can be prepared containing extremely small quantities of medicaments.

EXAMPLE 19

A solution of 5 grams of dextroamphetamine base in 25 milliliters of a mixture of 80 parts of chloroform and 20 parts of ethanol by volume was prepared and 3.3 microliter drops of this solution were permitted to fall on a powder bed composed of 35 parts of cellulose acetate phthalate and 65 parts of aluminum aspirin. The beads that formed were separated from the powder bed and dried.

The resulting beads were well formed and firm despite the fact that each bead contained approximately 0.67 milligram of the oily amphetamine base and showed no trace or appearance of oiliness.

This example illustrates that oily, fatty or greasy substances can be incorporated into beads according to the invention.

EXAMPLE 20

A mixture of 5 grams of carboxypolymethylene and 10 grams of dodecylamine was treated with 50 milliliters of methylene chloride. The solvent was evaporated and the dried residue was screened through a 100 mesh sieve. This was used as the powder bed.

A solution of 3 grams of chlorpheniramine maleate in a mixture of 85 parts of methylene chloride, 12 parts of methanol and 3 parts of water was prepared and drops of this solution were permitted to fall on the above powder bed. Satisfactory beads formed which were separated from the powder bed and dried.

EXAMPLE 21

A powder bed was prepared composed of 15 parts of cellulose acetate phthalate and 85 parts of aluminum naphthenate.

A solution was made in which 2 parts of phenyl mercuric acetate was dissolved in 10 parts of a solvent mixture composed of 8 parts of methylene chloride and 2 parts of methanol.

Drops of the phenyl mercuric acetate solution were permitted to fall on the powder bed and the beads that formed were separated from the powder bed by screening and dried by evaporation of the solvent mixture. The beads were excellent as to shape and appearance.

EXAMPLE 22

A powder bed composed of 12 grams of a mixture containing 2 parts of cellulose acetate phthalate and 8 parts of aluminum aspirin and 7 grams of chlorpheniramine maleate was prepared and screened through a 200 mesh sieve. Drops of a solvent mixture consisting of 90 parts of methylene chloride and 10 parts of methanol were permitted to fall onto the bed to form beads. Beads were made using drops of both 3.3 and 1.25 microliter volume. The beads from each drop size were separately collected and dried.

The beads from the 3.3 microliter drop had an average weight of 3.70 milligrams and an average diameter of 2.1 millimeters and each drop contained 1.37 milligrams of chlorpheniramine maleate.

The beads from the 1.25 microliter drop had an average weight of 2.00 milligrams and an average diameter of 1.67 millimeters and contained approximately 0.75 milligram of chlorpheniramine maleate.

EXAMPLE 23

A powder blend of 20 grams of meprobamate, 1.75 grams of cellulose acetate phthalate and 1.25 grams of aluminum abietate was prepared. Drops of a solvent mixture of 80 parts of methylene chloride and 20 parts of methanol were permitted to fall on the powder bed. The formed beads were separated from the powder bed and dried. They were of good shape and had an average weight of 3.8 milligrams and an average amount of meprobamate per bead of 3.2 milligrams.

This example illustrates that the medicament can be incorporated in the powder bed.

EXAMPLE 24

A blend of 5 grams of phendimetrazine bitartrate, 10 grams of aluminum aspirin and 4 grams of cellulose acetate phthalate was prepared. Drops of a solvent mixture of 80 parts of chloroform and 20 parts of ethanol were permitted to fall onto the powder blend. The formed beads were separated from the powder and dried.

The average weight of the beads was 4.30 milligrams and by calculation each bead contained 1.12 milligrams of phendimetrazine bitartrate. By assay the beads were found to contain, on the average, 1.07 milligrams of phendimetrazine bitartrate.

On exposure to simulated gastric and intestinal fluids the beads gave the following release data:

| | Percent cumulative release |
|---|---|
| After 1 hour gastric | 26 |
| After 2 hours intestinal | 62 |
| After 4 hours intestinal | 85 |
| After 6 hours intestinal | 100 |

EXAMPLE 25

A solution of 4 grams of phenylephrine hydrochloride and 800 milligrams of chlorpheniramine maleate in 60 milliliters of a mixture of 48 milliliters of methylene chloride and 12 milliliters of methanol was prepared.

Drops of this solution having a volume of 3.3 microliters were permitted to fall on a powder bed composed of 2 parts of cellulose acetate phthalate and 20 parts of aspirin powder and 3 parts of aluminum aspirin. The formed beads were collected and dried.

The average weight of the beads was 3.50 milligrams and each bead contained approximately 0.2 milligram of phenylephrine hydrochloride, 0.04 milligram of chlorpheniramine maleate and 2.6 milligrams of aspirin.

The foregoing is intended as illustrative and not as limitative since within the terms of the appended claims various modifications can be made without departing from the scope or principles of the invention.

With regard to medicament-containing beads, it is to be understood that they may be administered for the treatment of diseases or conditions for which the particular medicaments are of known utility in any suitable dosage form. They may, for example, be used as such or a desired or required number of beads may be sealed into gelatin capsules. In many instances, the beads can also be formed into compressed tablets with or without one of the usual pharmaceutical excipients or carriers. The products are particularly intended as and valuable for sustained release medication and due to the accuracy and precision with which the beads can be made with respect to their medicament content, unusually effective and controlled results are obtainable. It is also to be understood that while the invention contemplates the use of a preselected number of particular beads the invention is not limited thereto since beads of two or more compositions can be combined and administered conjointly if desired or if medically indicated. It is further to be understood that the invention is not restricted to medicament-containing beads for oral ingestion since other actve ingredients of a wide variety can be made into beads and used for other purposes such as in agriculture as an herbicide or for crab grass control or other foliage and plant life treatment. This is exemplified by phenyl mercuric acetate. Other organic mercury compounds in general and other phenyl mercury compounds in particular may be thus formed into beads. The invention also extends to antibacterials and fungicides as well as to other active ingredients suitable for administration to humans and to animals as veterinary products.

What is claimed is:

1. A method of producing small spherical beads of substantially identical and predetermined size and composition and containing at least one active ingredient which comprises allowing drops of at least one solvent selected from the group consisting of solvents for the polymer and solvents for the polymer and active ingredient to fall onto a bed of a finely divided solid polymer, screening out the spherical beads thus formed and drying them by evaporating the solvent, there being at least one active ingredient present in at least one member selected from the group consisting of solvent and polymer bed.

2. A method of producing small spherical beads of substantially identical and predetermined size and composition and containing at least one active ingredient which comprises allowing drops of at least one solvent selected from the group consisting of solvents for the polymer and solvents for the polymer and active ingredient to fall onto a bed of a finely divided solid polymer, screening out the spherical beads thus formed and drying them by evaporating the solvent, there being at least one active ingredient in the solvent.

3. A method of producing small spherical beads of substantially identical and predetermined size and composition and containing at least one active ingredient which comprises allowing drops of at least one solvent selected from the group consisting of solvents for the polymer and solvents for the polymer and active ingredient to fall onto a bed of a finely divided solid polymer, screening out the spherical beads thus formed and drying them by evaporating the solvent, there being at least one medicament in the polymer bed.

4. A method of producing small spherical beads of substantially identical and predetermined size and composition and containing at least one active ingredient which comprises allowing drops of at least one solvent selected from the group consisting of solvents for the polymer and solvents for the polymer and active ingredient to fall onto a bed of a finely divided solid polymer at least as fine as 80 mesh, screening out the spherical beads thus formed and drying them by evaporating the solvent, there being at least one active ingredient present in at least one member selected from the group consisting of solvent and polymer bed.

5. A method of producing small spherical beads of substantially identical and predetermined size and composition and containing at least one active ingredient which comprises allowing drops of at least one solvent selected from the group consisting of solvents for the polymer and solvents for the polymer and active ingredient to fall onto a bed of a finely divided solid polymer of 200 mesh, screening out the spherical beads thus formed and drying them by evaporating the solvent, there being at least one active ingredient present in at least one member selected from the group consisting of solvent and polymer bed.

6. A method of producing small spherical beads of substantially identical and predetermined size and composition and containing at least one active ingredient which comprises allowing drops of at least one solvent selected from the group consisting of solvents for the polymer, solvents for the polymer and cosubstance, solvents for the polymer and active ingredient and solvents for the polymer, cosubstance and active ingredient to fall onto a bed of a finely divided solid polymer, screening out the spherical beads thus formed and drying them by evaporating the solvent, there being at least one active ingredient present in at least one member selected from the group consisting of solvent and polymer bed, the polymer bed being composed of 10 to 100 percent cellulose acetate phthalate and 90 to 0 percent of a cosubstance.

7. A method of producing small spherical beads of substantially identical and predetermined size and composition and containing at least one active ingredient which comprises allowing drops of at least one solvent selected from the group consisting of solvents for the polymer, solvents for the polymer and cosubstance, solvents for the polymer and active ingredient and solvents for the polymer, cosubstance and active ingredient to fall onto a bed of a finely divided solid polymer, screening out the spherical beads thus formed and drying them by evaporating the solvent, there being at least one active ingredient present in at least one member selected from the group consisting of solvent and polymer bed, the polymer bed being composed of 10 to 100 percent cellulose acetate phthalate and 90 to 0 percent of aluminum aspirin as a cosubstance.

8. A method of producing small spherical beads of substantially identical and predetermined size and composition and containing at least one active ingredient which comprises allowing drops of at least one solvent selected from the group consisting of solvents for the polymer, solvents for the polymer and cosubstance, solvents for the polymer and active ingredient and solvents for the polymer, cosubstance and active ingredient to fall onto a bed of a finely divided solid polymer, screening out the spherical beads thus formed and drying them by evaporating the solvent, there being at least one active ingredient present in at least one member selected from the group consisting of solvent and polymer bed, and a cosubstance dissolved in said solvent.

9. A method of producing small spherical beads of substantially identical and predetermined size and composition and containing at least one active ingredient which comprises allowing drops of at least one solvent selected from the group consisting of solvents for the polymer, solvents for the polymer and cosubstance, solvents for the polymer and active ingredient and solvents for the polymer, cosubstance and active ingredient to fall onto a bed of a finely divided solid polymer, screening out the spherical beads thus formed and drying them by evaporating the solvent, there being at least one active ingredient present in at least one member selected from the group consisting of solvent and polymer bed, and aluminum abietate dissolved in said solvent as a cosubstance.

10. A method of producing small spherical beads of substantially identical and predetermined size and composition and containing at least one active ingredient which comprises allowing drops of a drop size ranging from 0.25 to 15 microliters of at least one solvent selected from the group consisting of solvents for the polymer and solvents for the polymer and active ingredient to fall onto a bed of a finely divided solid polymer, screening out the spherical beads thus formed and drying them by evaporating the solvent, there being at least one active ingredient present in at least one member selected from the group consisting of solvent and polymer bed.

11. A method of producing small spherical beads of substantially identical and predetermined size and composition and containing at least one active ingredient which comprises allowing drops of at least one solvent selected from the group consisting of solvents for the polymer and solvents for the polymer and active ingredient to fall onto a bed of a finely divided solid polymer, screening out the spherical beads thus formed and wherein each bead has a diameter ranging from 0.3 to 3.5 millimeters with the beads of each batch being of the same size and drying them by evaporating the solvent, there being at least one active ingredient present in at least one member selected from the group consisting of solvent and polymer bed.

12. A method of producing small spherical beads of substantially identical and predetermined size and composition and containing at least one active ingredient which comprises allowing drops of a solvent mixture composed of a plurality of solvents selected from the group consisting of solvents for the polymer and solvents for the polymer and active ingredient to fall onto a bed of a finely divided solid polymer, screening out the spherical beads thus formed and drying them by evaporating the solvent, there being at least one active ingredient present in at least one member selected from the group consisting of solvent and polymer bed.

13. A method of producing small spherical beads of substantially identical and predetermined size and composition and containing at least one active ingredient which comprises allowing drops of a solvent mixture consisting of 90 percent methylene chloride and 10 percent methanol by volume to fall onto a bed of a finely divided solid polymer, screening out the spherical beads thus formed and drying them by evaporating the solvent, there being at least one active ingredient present in at least one member selected from the group consisting of solvent and polymer bed.

14. A group of small spherical beads of substantially identical size and composition formed by liquid solvent drops falling on a bed of finely divided solid polymer and each of which contains a predetermined like amount of at least one active ingredient which is substantially completely releasable at a controlled rate and each such bead being of uniform, homogeneous composition throughout.

15. A group of small spherical beads of substantially identical size and composition formed by liquid solvent drops falling on a bed of finely divided solid polymer and each of which contains a predetermined like amount of at least one active ingredient which is substantially completely releasable at a controlled rate and each such bead being of uniform, homogeneous composition throughout and said beads being sealed into capsules in a total number per capsule to provide a total desired dosage of the active ingredient over a predetermined period of time.

16. A group of small spherical beads of substantially identical size and composition formed by liquid solvent drops falling on a bed of finely divided solid polymer and each of which contains a predetermined like amount of at least one antibacterial which is substantially completely releasable at a controlled rate and each such bead being of uniform, homogeneous composition throughout.

17. A group of small spherical beads of substantially identical size and composition formed by liquid solvent drops falling on a bed of finely divided solid polymer and each of which contains a predetermined like amount of at least one fungicide which is substantially completely releasable at a controlled rate and each such bead being of uniform, homogeneous composition throughout.

References Cited

UNITED STATES PATENTS

| | | | |
|---|---|---|---|
| 2,579,944 | 12/1951 | Marshall | 167—82 |
| 2,648,609 | 8/1953 | Wurster | 117—100 |
| 2,853,420 | 9/1958 | Lowey | 167—82 |
| 2,954,323 | 9/1960 | Endicott et al. | 167—82 |
| 3,078,216 | 2/1963 | Grief | 167—82 |

FOREIGN PATENTS

| | | |
|---|---|---|
| 29,357 | 3/1958 | Finland. |
| 576,690 | 5/1959 | Canada. |

ALBERT T. MEYERS, *Primary Examiner.*

GEORGE A. MENTIS, *Assistant Examiner.*